US010298684B2

(12) United States Patent
Baptist et al.

(10) Patent No.: US 10,298,684 B2
(45) Date of Patent: May 21, 2019

(54) ADAPTIVE REPLICATION OF DISPERSED DATA TO IMPROVE DATA ACCESS PERFORMANCE

(71) Applicant: International Business Machines Corporation, Armonk, NY (US)

(72) Inventors: Andrew D. Baptist, Mt. Pleasant, WI (US); S. Christopher Gladwin, Chicago, IL (US); Jason K. Resch, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 93 days.

(21) Appl. No.: 15/435,692

(22) Filed: Feb. 17, 2017

(65) Prior Publication Data
US 2017/0163730 A1    Jun. 8, 2017

Related U.S. Application Data

(63) Continuation-in-part of application No. 14/147,982, filed on Jan. 6, 2014, now Pat. No. 9,894,151, which
(Continued)

(51) Int. Cl.
*G06F 3/06* (2006.01)
*H04L 29/08* (2006.01)
(Continued)

(52) U.S. Cl.
CPC ...... *H04L 67/1095* (2013.01); *G06F 11/1076* (2013.01); *G06F 17/30377* (2013.01);
(Continued)

(58) Field of Classification Search
CPC ...... G06F 3/065; G06F 3/0656; G06F 3/0689; G06F 3/067; G06F 12/08; G06F 11/1076
See application file for complete search history.

(56) References Cited

U.S. PATENT DOCUMENTS 4,092,732 A    5/1978    Ouchi
5,263,085 A   11/1993    Shamir
(Continued)

FOREIGN PATENT DOCUMENTS

WO    2009048726 A1    4/2009

OTHER PUBLICATIONS

Li, "A Novel Pairwise Keys Pre-Distribution Scheme Based on Binary Tree in Wireless Sensor Networks", 2006 6th International Conference on ITS Telecommunications Proceedings, 2006, IEEE, pp. 913-916.
(Continued)

*Primary Examiner* — Than Nguyen
(74) *Attorney, Agent, or Firm* — Garlick & Markison; Timothy W. Markison; Harry S. Tyson, Jr.

(57) ABSTRACT

Adaptive replication of data in a dispersed storage network (DSN) to improve data access performance. In various examples, a DSN storage unit determines that a frequency of slice access of an encoded data slice stored by the storage unit compares unfavorably to a first slice access threshold (e.g., a greater number of accesses than a threshold number of accesses over a given period of time). The storage unit then identifies at least one secondary storage unit and replicates the encoded data slice to generate a replicated encoded data slice. The replicated encoded data slice is then sent to the at least one secondary storage unit for storage therein. In addition, a slice storage location table is updated to associate the at least one secondary storage unit and the replicated encoded data slice such that future access requests for the encoded data slice may be re-directed to a secondary storage unit.

20 Claims, 6 Drawing Sheets

Related U.S. Application Data is a continuation of application No. 13/413,232, filed on Mar. 6, 2012, now Pat. No. 8,627,091.

(60) Provisional application No. 61/470,524, filed on Apr. 1, 2011.

(51) Int. Cl.

| | | |
|---|---|---|
| G06F 17/30 | (2006.01) | |
| G06F 11/10 | (2006.01) | |
| H04L 9/08 | (2006.01) | |
| H04L 9/32 | (2006.01) | |
| H04N 21/8358 | (2011.01) | |
| H04N 21/222 | (2011.01) | |

(52) U.S. Cl.
CPC ........ *G06F 17/30575* (2013.01); *H04L 9/085* (2013.01); *H04L 9/3247* (2013.01); *H04L 67/1004* (2013.01); *H04L 67/1097* (2013.01); *H04L 67/2847* (2013.01); *H04N 21/2223* (2013.01); *H04N 21/8358* (2013.01); *H04L 2209/34* (2013.01)

(56) References Cited

U.S. PATENT DOCUMENTS

| | | |
|---|---|---|
| 5,454,101 A | 9/1995 | Mackay et al. |
| 5,485,474 A | 1/1996 | Rabin |
| 5,627,893 A | 5/1997 | Demytko |
| 5,675,649 A | 10/1997 | Brennan et al. |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,490,680 B1 | 12/2002 | Scheidt et al. |
| 6,550,009 B1 | 4/2003 | Uranaka et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 6,947,563 B2 | 9/2005 | Fagin et al. |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,079,654 B1 | 7/2006 | Remery et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,127,067 B1 | 10/2006 | Wachtler et al. |
| 7,136,489 B1 | 11/2006 | Madhusudhana et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,187,772 B2 | 3/2007 | Vora et al. |
| 7,194,628 B1 | 3/2007 | Guthery |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,636,724 B2 | 12/2009 | de la Torre et al. |
| 7,636,764 B1 | 12/2009 | Fein et al. |
| 8,031,875 B1 | 10/2011 | Juels et al. |
| 8,520,855 B1 | 8/2013 | Kohno et al. |
| 2001/0038696 A1 | 11/2001 | Frankel et al. |
| 2002/0013898 A1 | 1/2002 | Sudia et al. |
| 2002/0062422 A1 | 5/2002 | Butterworth et al. |
| 2002/0104025 A1 | 8/2002 | Wrench |
| 2002/0116611 A1 | 8/2002 | Zhou et al. |
| 2002/0141594 A1 | 10/2002 | MacKenzie et al. |
| 2002/0166079 A1 | 11/2002 | Ulrich et al. |
| 2003/0018927 A1 | 1/2003 | Gadir et al. |
| 2003/0026432 A1 | 2/2003 | Woodward |
| 2003/0037261 A1 | 2/2003 | Meffert et al. |
| 2003/0065617 A1 | 4/2003 | Watkins et al. |
| 2003/0084020 A1 | 5/2003 | Shu |
| 2003/0088782 A1 | 5/2003 | Forrest |
| 2003/0088783 A1 | 5/2003 | DiPierro |
| 2003/0120929 A1 | 6/2003 | Hoffstein et al. |
| 2003/0120931 A1 | 6/2003 | Hopkins et al. |
| 2003/0172280 A1 | 9/2003 | Scheidt et al. |
| 2003/0194086 A1 | 10/2003 | Lambert |
| 2003/0204602 A1* | 10/2003 | Hudson ................ D01D 5/423 709/228 |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula |
| 2005/0132070 A1 | 6/2005 | Redlich et al. |
| 2005/0144382 A1 | 6/2005 | Schmisseur |
| 2005/0195973 A1 | 9/2005 | Ibrahim |
| 2005/0229069 A1 | 10/2005 | Hassner et al. |
| 2005/0240591 A1 | 10/2005 | Marceau et al. |
| 2005/0262038 A1 | 11/2005 | Sepez et al. |
| 2006/0034494 A1 | 2/2006 | Holloran |
| 2006/0047907 A1 | 3/2006 | Shiga et al. |
| 2006/0075246 A1 | 4/2006 | Suga |
| 2006/0130154 A1 | 6/2006 | Lam et al. |
| 2006/0136448 A1 | 6/2006 | Cialini et al. |
| 2006/0153364 A1 | 7/2006 | Beeson |
| 2006/0155939 A1* | 7/2006 | Nagasoe ................ G06F 3/062 711/152 |
| 2006/0156059 A1 | 7/2006 | Kitamura |
| 2006/0177061 A1 | 8/2006 | Orsini et al. |
| 2006/0224603 A1 | 10/2006 | Correll |
| 2006/0236056 A1 | 10/2006 | Nagata |
| 2007/0016776 A1 | 1/2007 | Lucidarme |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0101140 A1 | 5/2007 | Rhoads |
| 2007/0116269 A1 | 5/2007 | Nochta |
| 2007/0130084 A1 | 6/2007 | Kay et al. |
| 2007/0174192 A1 | 7/2007 | Gladwin et al. |
| 2007/0214285 A1 | 9/2007 | Au et al. |
| 2007/0223706 A1 | 9/2007 | Gantman et al. |
| 2007/0234110 A1 | 10/2007 | Soran et al. |
| 2007/0283167 A1 | 12/2007 | Venters et al. |
| 2008/0181413 A1 | 7/2008 | Yi et al. |
| 2008/0226065 A1 | 9/2008 | Zunke |
| 2009/0003663 A1 | 1/2009 | Webster |
| 2009/0080659 A1 | 3/2009 | Elder et al. |
| 2009/0094251 A1 | 4/2009 | Gladwin et al. |
| 2009/0094318 A1 | 4/2009 | Gladwin et al. |
| 2009/0132830 A1 | 5/2009 | Haga et al. |
| 2009/0254750 A1 | 10/2009 | Bono et al. |
| 2009/0265555 A1 | 10/2009 | Royer |
| 2009/0300362 A1 | 12/2009 | Shaik |

(56) References Cited

U.S. PATENT DOCUMENTS

| | | | |
|---|---|---|---|
| 2009/0323972 | A1 | 12/2009 | Kohno et al. |
| 2010/0023524 | A1 | 1/2010 | Gladwin et al. |
| 2010/0023771 | A1 | 1/2010 | Struik |
| 2010/0037055 | A1 | 2/2010 | Fazio et al. |
| 2010/0037056 | A1 | 2/2010 | Follis et al. |
| 2010/0054481 | A1 | 3/2010 | Jajodia et al. |
| 2010/0131755 | A1 | 5/2010 | Zhu et al. |
| 2010/0161817 | A1 | 6/2010 | Xiao et al. |
| 2010/0180116 | A1 | 7/2010 | Coan et al. |
| 2010/0235638 | A1 | 9/2010 | Irvine |
| 2010/0242101 | A1 | 9/2010 | Reese, Jr. |
| 2010/0262837 | A1 | 10/2010 | Kulin |
| 2010/0266120 | A1 | 10/2010 | Leggette et al. |
| 2010/0266132 | A1 | 10/2010 | Bablani et al. |
| 2010/0268966 | A1 | 10/2010 | Leggette et al. |
| 2010/0269008 | A1 | 10/2010 | Leggette et al. |
| 2010/0275026 | A1 | 10/2010 | McLean |
| 2011/0047380 | A1 | 2/2011 | Miller |
| 2011/0055578 | A1 | 3/2011 | Resch |
| 2011/0099203 | A1 | 4/2011 | Fastring |
| 2011/0126295 | A1 | 5/2011 | Resch |
| 2011/0208970 | A1 | 8/2011 | Brown et al. |
| 2012/0102286 | A1 | 4/2012 | Holt et al. |
| 2014/0068260 | A1 | 3/2014 | Oney et al. |

OTHER PUBLICATIONS

Libert, "Adaptively Secure Non-Interactive Threshold Cryptosystems", International Colloquium on Automata, Languages, and Programming, 2011, pp. 588-600.

Libert, "Non-Interactive CCA-Secure Threshold Cryptosystems with Adaptive Security: New Framework and Constructions" ,Theory of Cryptography, 2012, pp. 75-93.

Plank, T1: Erasure Codes for Storage Applications; FAST2005, 4th Usenix Conference on File Storage Technologies; Dec. 13-16, 2005; pp. 1-74.

Chung; An Automatic Data Segmentation Method for 3D Measured Data Points; National Taiwan University; pp. 1-8; 1998.

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Ong, "Optimizing Robustness while Generating Shared Secret Safe Primes", University of California, Berkeley, 2005, 18 pages.

Rabin; Efficient Dispersal of Information for Security, Load Balancing, and Fault Tolerance; Journal of the Association for Computer Machinery; vol. 36, No. 2; Apr. 1989; pp. 335-348.

Rhea, "Pond: the OceanStore Prototype", University of California, Berkeley, Jan. 6, 2003, 34 pages.

Rhea, "The OceanStore Write Path", University of California, Berkeley, Jun. 11, 2002, 43 pages.

Satran, et al.; Internet Small Computer Systems Interface (iSCSI); IETF Network Working Group; RFC 3720; Apr. 2004; pp. 1-257.

Schnitzer, "Secured Storage Using Secure Parser", StorageSS'05, Nov. 11, 2015, Fairfax, Virginia, USA,. pp. 135-140.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Wiegand, "Scalable Video Coding for IPTV Services", IEEE Transactions on Broadcasting, vol. 55, No. 2, Jun. 2009, pp. 527-538.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Working Group; RFC 4518; Jun. 2006; pp. 1-14.

Zeilenga; Lightweight Directory Access Protocol (LDAP): String Representation of Distinguished Names; IETF Network Working Group; RFC 4514; Jun. 2006; pp. 1-15.

\* cited by examiner

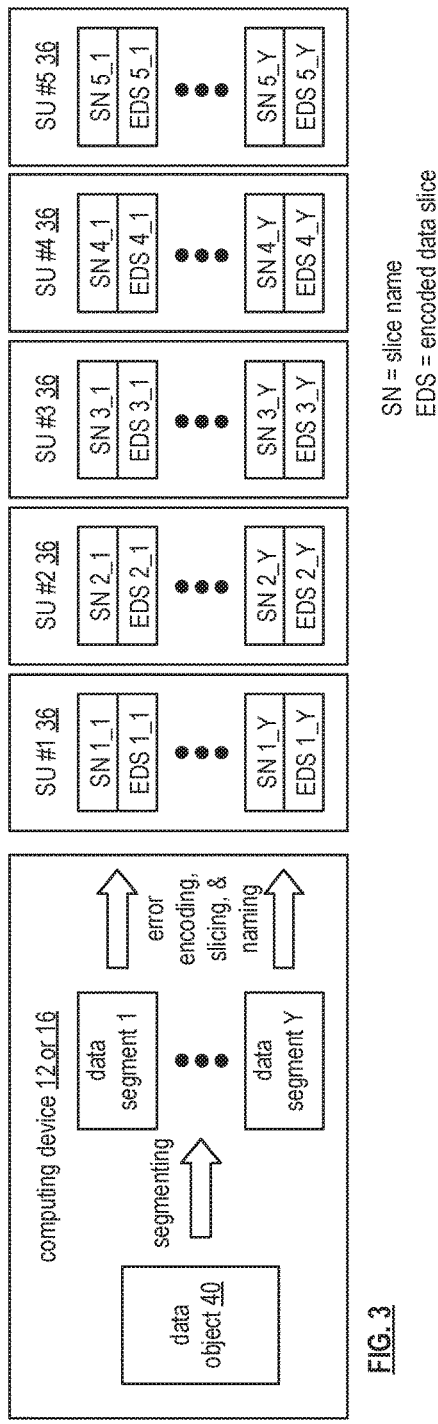
FIG. 3
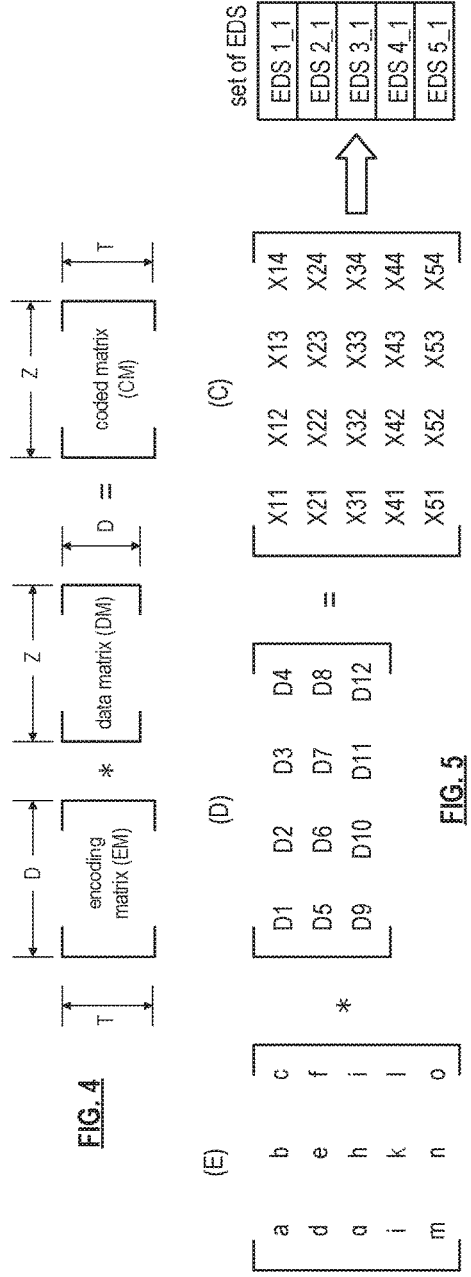
FIG. 4
FIG. 5
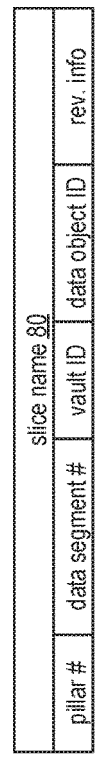
FIG. 6

ADAPTIVE REPLICATION OF DISPERSED DATA TO IMPROVE DATA ACCESS PERFORMANCE

CROSS-REFERENCE TO RELATED APPLICATIONS

The present U.S. Utility patent application claims priority pursuant to 35 U.S.C. § 120 as a continuation-in-part of U.S. Utility application Ser. No. 14/147,982, entitled "GENERATING A SECURE SIGNATURE UTILIZING A PLURALITY OF KEY SHARES," filed Jan. 6, 2014, which is a continuation of U.S. Utility application Ser. No. 13/413,232, entitled "GENERATING A SECURE SIGNATURE UTILIZING A PLURALITY OF KEY SHARES," filed Mar. 6, 2012 and now issued as U.S. Pat. No. 8,627,091, which claims priority pursuant to 35 U.S.C. § 119(e) to U.S. Provisional Application No. 61/470,524, entitled "ENCODING DATA STORED IN A DISPERSED STORAGE NETWORK," filed Apr. 1, 2011, all of which are hereby incorporated herein by reference in their entirety and made part of the present U.S. Utility patent application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks, and more particularly to adaptive replication of stored data in a dispersed storage network.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on a remote storage system. The remote storage system may include a RAID (redundant array of independent disks) system and/or a dispersed storage system that uses an error correction scheme to encode data for storage.

In a RAID system, a RAID controller adds parity data to the original data before storing it across an array of disks. The parity data is calculated from the original data such that the failure of a single disk typically will not result in the loss of the original data. While RAID systems can address certain memory device failures, these systems may suffer from effectiveness, efficiency and security issues. For instance, as more disks are added to the array, the probability of a disk failure rises, which may increase maintenance costs. When a disk fails, for example, it needs to be manually replaced before another disk(s) fails and the data stored in the RAID system is lost. To reduce the risk of data loss, data on a RAID device is often copied to one or more other RAID devices. While this may reduce the possibility of data loss, it also raises security issues since multiple copies of data may be available, thereby increasing the chances of unauthorized access. In addition, co-location of some RAID devices may result in a risk of a complete data loss in the event of a natural disaster, fire, power surge/outage, etc.

BRIEF DESCRIPTION OF THE SEVERAL VIEWS OF THE DRAWING(S)

FIG. 3 is a schematic block diagram of an example of dispersed storage error encoding of data in accordance with the present disclosure;

FIG. 4 is a schematic block diagram of a generic example of an error encoding function in accordance with the present disclosure;

FIG. 5 is a schematic block diagram of a specific example of an error encoding function in accordance with the present disclosure;

FIG. 6 is a schematic block diagram of an example of slice naming information for an encoded data slice (EDS) in accordance with the present disclosure;

DETAILED DESCRIPTION OF THE INVENTION

Figure 1:
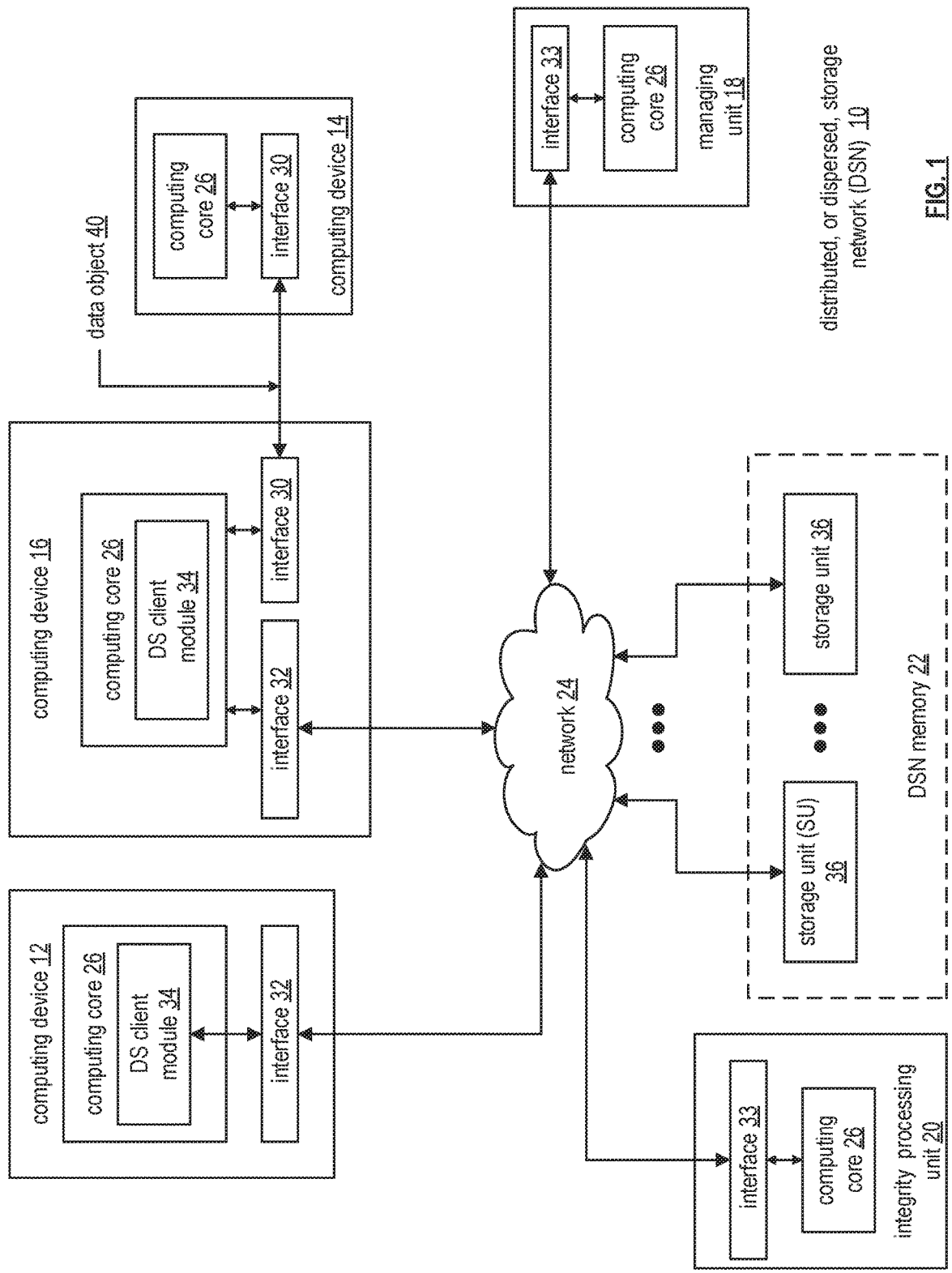
FIG. 1 is a schematic block diagram of an embodiment of a dispersed or distributed storage network (DSN) in accordance with the present disclosure.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
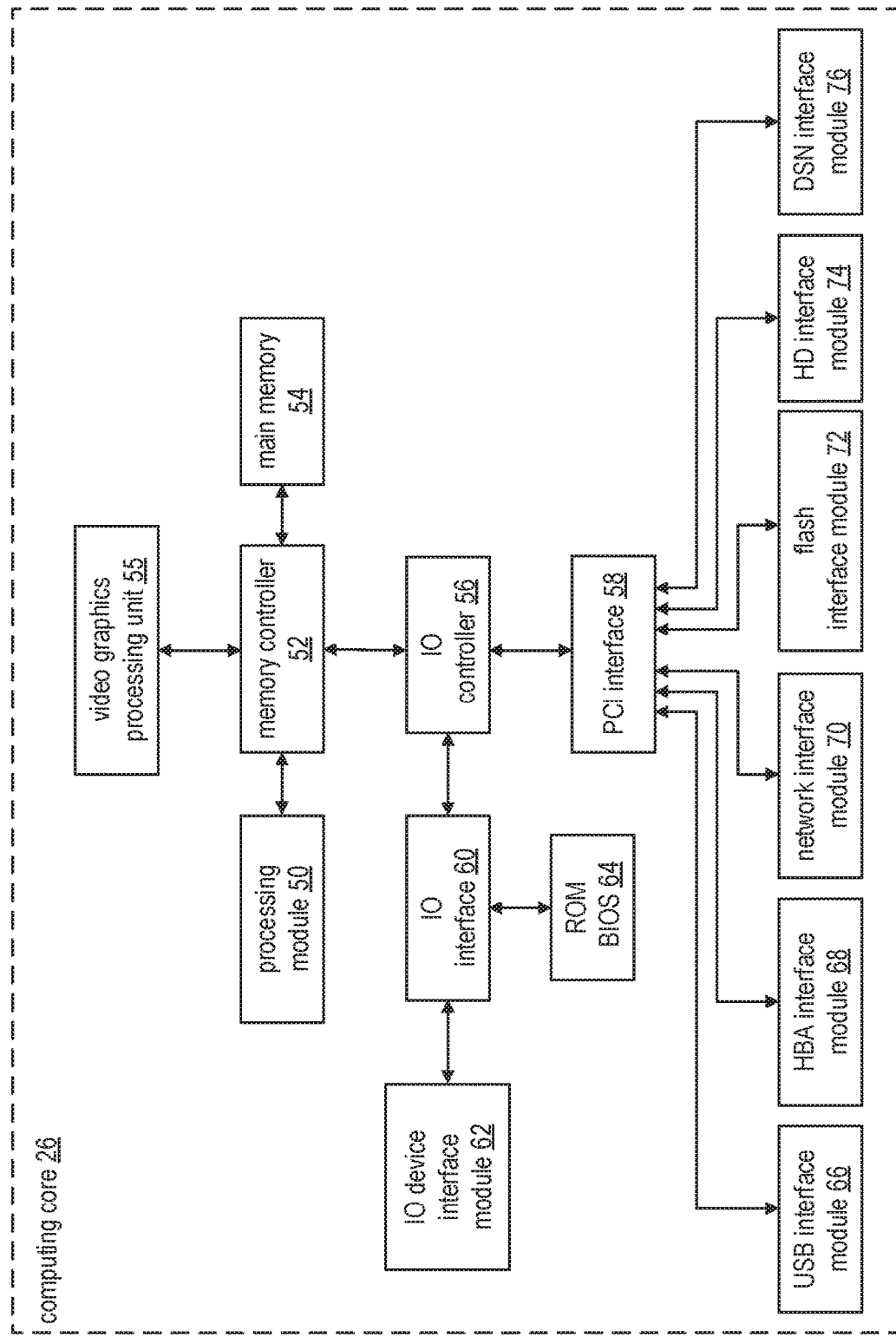
FIG. 2 is a schematic block diagram of an embodiment of a computing core in accordance with the present disclosure.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed storage (DS) error encoded data.

Each of the storage units 36 is operable to store DS error encoded data and/or to execute (e.g., in a distributed manner) maintenance tasks and/or data-related tasks. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, maintenance tasks (e.g., rebuilding/replication of data slices, updating hardware, rebooting software, restarting a particular software process, performing an upgrade, installing a software patch, loading a new software revision, performing an off-line test, prioritizing tasks associated with an online test, etc.), etc.

Each of the computing devices 12-16, the managing unit 18, integrity processing unit 20 and (in various embodiments) the storage units 36 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data (e.g., data object 40) as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate per-access billing information. In another instance, the managing unit 18 tracks the amount of data stored and/or retrieved by a user device and/or a user group, which can be used to generate per-data-amount billing information.

As another example, the managing unit 18 performs network operations, network administration, and/or network maintenance. Network operations includes authenticating user data allocation/access requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10. Examples of load balancing, service differentiation and dynamic resource selection for data access operations are discussed in greater detail with reference to FIGS. 9-13.

To support data storage integrity verification within the DSN 10, the integrity processing unit 20 (and/or other devices in the DSN 10) may perform rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. Retrieved encoded slices are checked for errors due to data corruption, outdated versioning, etc. If a slice includes an error, it is flagged as a 'bad' or 'corrupt' slice. Encoded data slices that are not received and/or not listed may be flagged as missing slices. Bad and/or missing slices may be subsequently rebuilt using other retrieved encoded data slices that are deemed to be good slices in order to produce rebuilt slices. A multi-stage decoding process may be employed in certain circumstances to recover data even when the number of valid encoded data slices of a set of encoded data slices is less than a relevant decode threshold number. The rebuilt slices may then be written to DSN memory 22. Note that the integrity processing unit 20 may be a separate unit as shown, included in DSN memory 22, included in the computing device 16, and/or distributed among the storage units 36.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment (i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of five, a decode threshold of three, a read threshold of four, and a write threshold of four. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number. In the illustrated example, the value X11=aD1+bD5+cD9, X12=aD2+bD6+cD10, . . . X53=mD3+nD7+oD11, and X54=mD4+nD8+oD12.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as at least part of a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
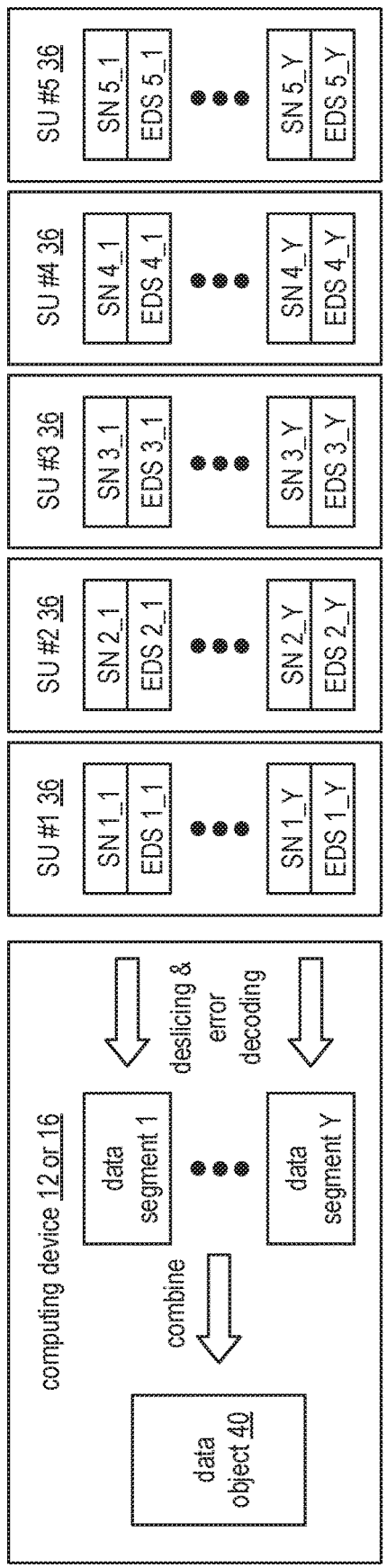
FIG. 7 is a schematic block diagram of an example of dispersed storage error decoding of data in accordance with the present disclosure.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
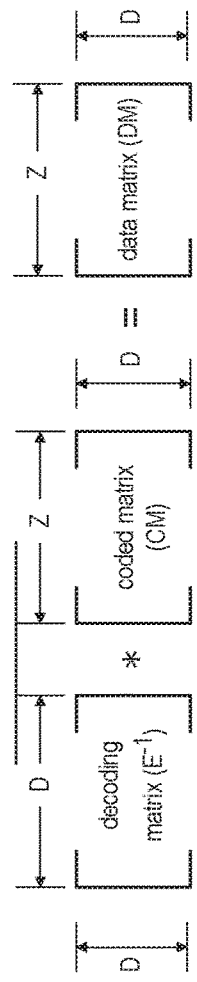
FIG. 8 is a schematic block diagram of a generic example of an error decoding function in accordance with the present disclosure.

In order to recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

In general, DSN memory stores a plurality of dispersed storage (DS) error encoded data. The DS error encoded data may be encoded in accordance with one or more examples described with reference to FIGS. 3-6, and organized (for example) in slice groupings or pillar groups. The data that is encoded into the DS error encoded data may be of any size and/or of any content. For example, the data may be one or more digital books, a copy of a company's emails, a large-scale Internet search, a video security file, one or more entertainment video files (e.g., television programs, movies, etc.), data files, and/or indexing and key information for use in dispersed storage operations.

In a dispersed storage network, it is natural for some stored data (also referred to herein as "data objects") to be of greater importance or in greater demand than other stored data. Often, the relative demand for a given piece of data is a dynamic metric that evolves and peaks (sometimes rapidly) over time. Knowing the frequency of access, relative importance, size, etc. of data may be useful when determining appropriate resources for storing the data. As described more fully below in conjunction with the novel examples of FIGS. 9 and 10, DSN information is utilized for dynamic resource selection and routing when storing frequently accessed data or data stored in heavily burdened storage units (e.g., for purposes of improving throughput performance and through the use of replicated data).

Dispersed storage offers the ability to adaptively scale at speeds much greater than that of copy-based storage schemes, as replication of an encoded data slice can be generally be performed more quickly than replication of an entire data object. When experiencing heavy load levels, a storage unit in accordance with the present disclosure can designate one or more secondary storage units to receive a replicated data slice for temporary storage, and redirect requests for the data slice to the one or more secondary storage units. A temporarily stored replicated data slice may expire after: the rate of requests slows to a point where the originating storage unit can sufficiently address access requests, the elapsed period of time since a request was received for the slice exceeds a predetermined threshold amount of time, upon expiration of a fixed timer, or in the event that a storage unit hosting the replicated data slice becomes overburdened (in which case, the storage unit may initiate a further replication process).

Figure 9:
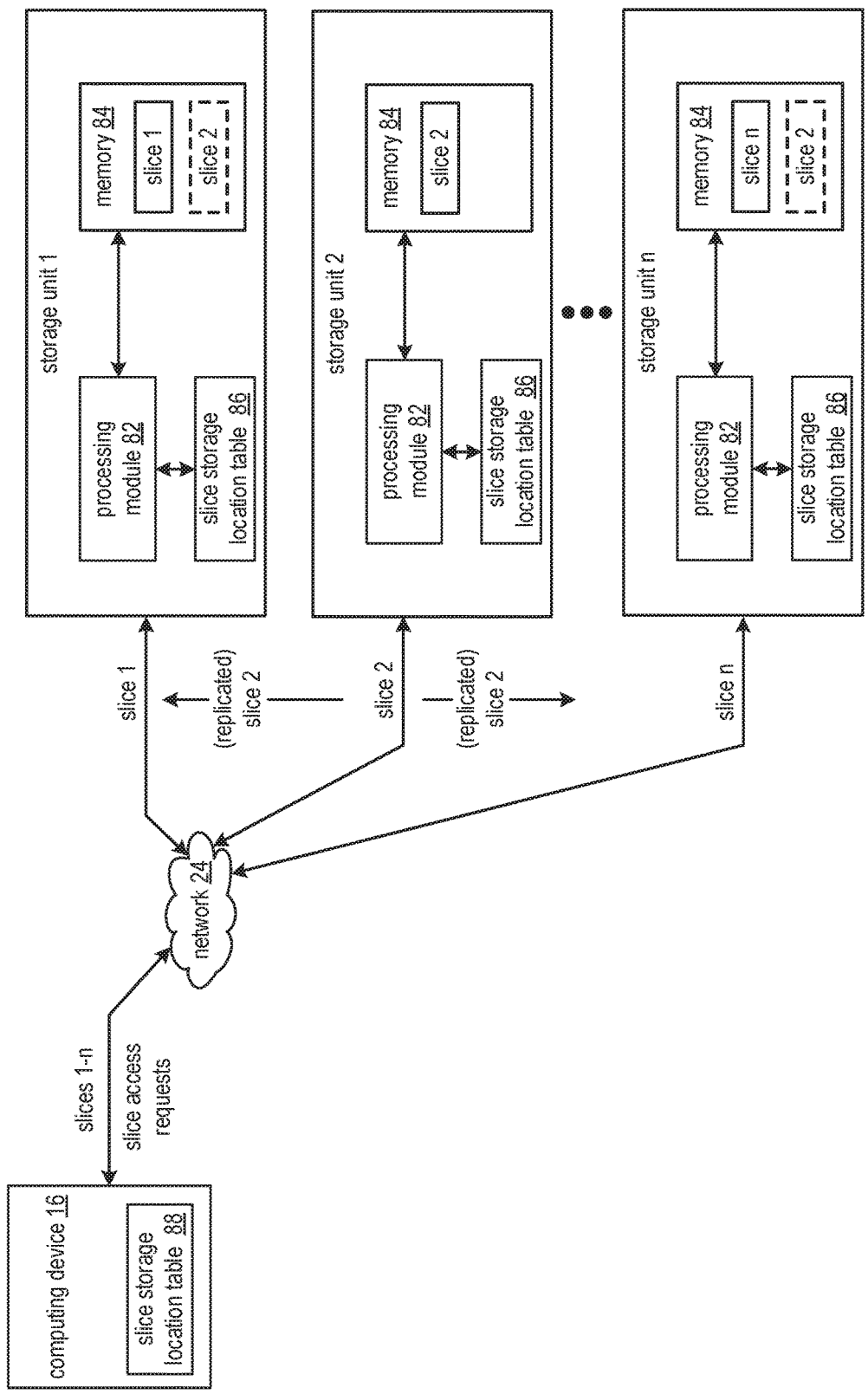
FIG. 9 is a schematic block diagram of another embodiment of a DSN performing replication of encoded data slices in accordance with the present disclosure.

Referring now to FIG. 9, a schematic block diagram of another embodiment of a DSN performing replication of encoded data slices in accordance with the present disclosure is shown. The illustrated DSN includes the network 24 of FIG. 1, and the computing device 16 and network 24 of FIG. 1. The illustrated DSN memory includes a set of storage units 1-$n$ (where, for example, n is an integer greater than or equal to three). Each storage unit may be implemented utilizing the storage unit 36 of FIG. 1, and each of the storage units includes a DS client module 34 (not separately illustrated), a processing module 82, memory 84, and a slice storage location table 86. The storage units of a storage set may be located at a same physical location (site) or located at multiple physical locations without departing from the technology as described herein.

Each of the storage units 1-$n$ include a slice storage location table 86 that is used when processing slice access requests, and affiliates slice names associated with encoded data slices with relevant storage locations/storage unit identifier information. Alternatively, or in addition, the computing device 16 (or another device of the DSN) may maintain a slice storage location table 86 when it is functioning as a higher-level controller for the storage units 1-$n$.

In the illustrated example, the computing device 16 issues write slice requests to store slices (e.g., encoded data slices) 1-$n$ in memory 84 of respective storage units 1-$n$, as reflected in one or more slice storage location tables. Using storage unit 2 as an example, the processing module 82 may determine that the frequency of slice access of slice 2 compares unfavorably to a slice access threshold. The processing module may obtain the frequency of slice access based on one or more of a frequency of slice access query, a lookup, a list, an error message, a request, and a command. For example, the processing module determines that the frequency of slice access compares unfavorably to (e.g., exceeds) the slice access threshold when the frequency of slice 2 access over a specified period of time exceeds or is likely to exceed a threshold number of accesses. The processing module 82 then determines at least one secondary storage unit for storage of a replicated slice 2, generates the replicated slice 2 and forwards it to one or more of the identified secondary storage units (e.g., storage unit 1 and storage unit n) for storage therein. As described more fully below in conjunction with FIG. 10, determining the at least one secondary storage unit may be based on a variety of factors, such as a performance requirement, an estimated access performance level, a storage unit location/address, etc.

In addition, the processing module 82 may update (or cause an update to) one or more of the slice storage location tables 86 and 88. For example, a slice storage location table may be updated to include an identifier associated with the at least one secondary storage unit, and affiliate a slice name associated with slice 2 with the identifier associated with the at least one secondary storage unit. Next, the processing module 82 may determine whether the frequency of slice access of (replicated) slice 2 compares favorably to a second slice access threshold. For example, the processing module determines that the frequency of slice access compares unfavorably to the second slice access threshold when the frequency of slice access is greater than the second slice access threshold. Alternatively, the determination may be made by a processing module 82 of a storage unit that stores a replicated slice 2. The first and second slice access thresholds may or may not be the same.

When the second slice access threshold compares favorably, the processing module 82 updates the relevant slice storage location table to exclude at least one of the at least one secondary storage units. Updates to the slice storage table may include disassociating the slice name associated with slice 2 with an identifier associated with at least one of the at least one secondary storage unit. The at least one secondary storage unit (either independently or at the direction of another device) may delete the replicated slice 2 after a fixed amount of time or when a time period since a last slice access is greater than a deletion time threshold.

Figure 10:
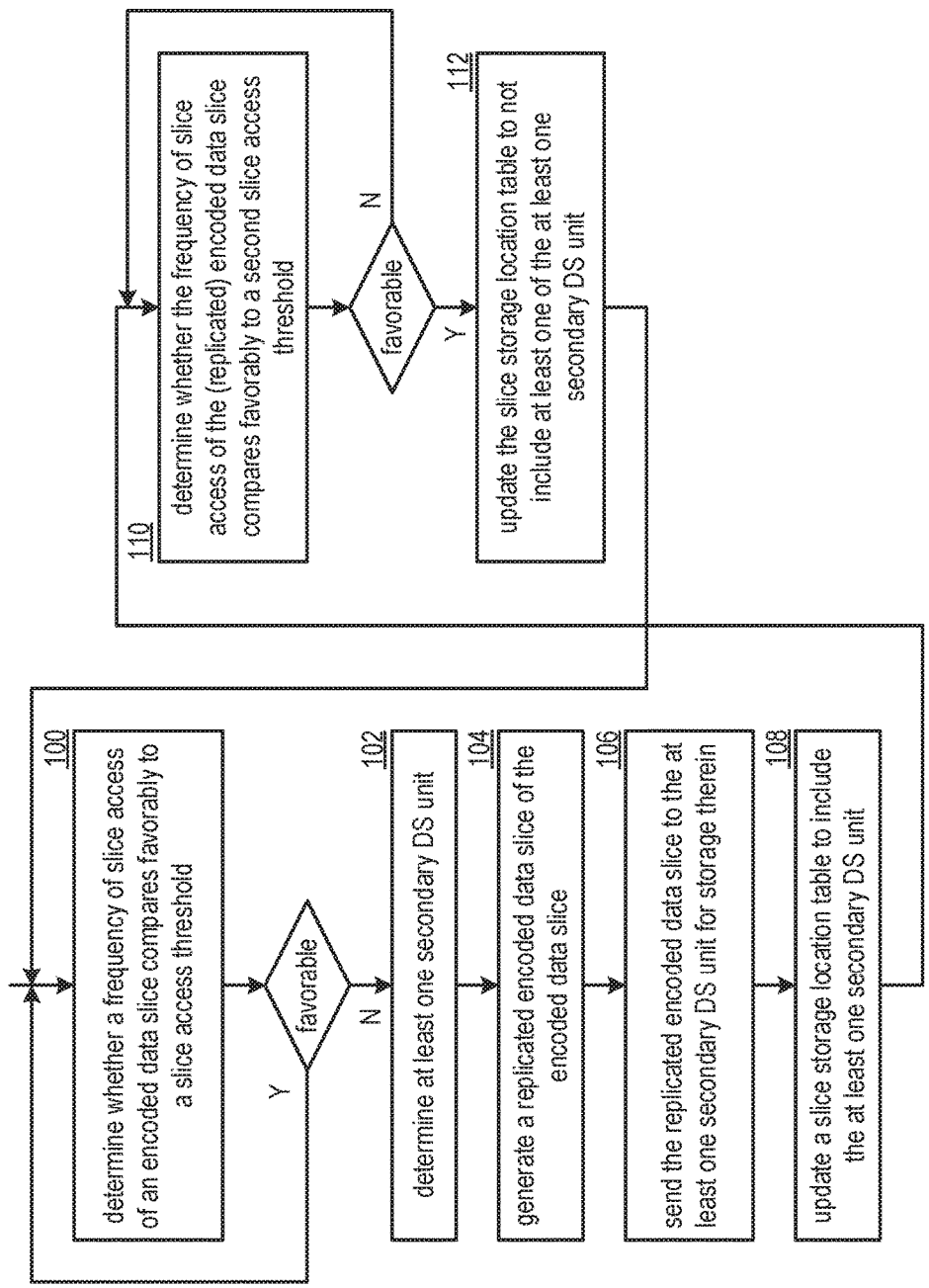
FIG. 10 is a logic diagram illustrating an example of replicating encoded data slices in accordance with the present disclosure.

FIG. 10 is a logic diagram illustrating an example of replicating encoded data slices in accordance with the present disclosure. The method begins at step 100 where a processing module (e.g., of a storage unit) determines whether a frequency of slice access of an encoded data slice compares favorably to a slice access threshold. The processing module may obtain the frequency of slice access based on one or more of a frequency of slice access query, a lookup, a list, an error message, a request, and a command. For example, the processing module determines that the frequency of slice access compares unfavorably to (e.g., exceeds) the slice access threshold when the frequency of slice access is 500 accesses per minute and the slice access threshold is 100 accesses per minute. The method loops at step 100 when the processing module determines that the frequency of access compares favorably to the slice access threshold. The method continues to step 102 when the processing module determines that the frequency of access compares unfavorably to the slice access threshold.

At step 102, the processing module determines at least one secondary storage unit. The determination may be based on one or more of a current access performance level, a performance requirement, an estimated access performance level, a request pattern, a candidate secondary storage unit list, a storage unit location, a storage unit performance level, and a storage unit Internet protocol (IP) address. For example, the processing module determines the at least one secondary storage unit to include a West Coast storage unit when the request pattern includes West Coast slice access requests and a storage unit performance level associated with the West Coast storage unit compares favorably to an access latency performance requirement.

The method continues at step 104 where the processing module generates a replicated encoded data slice of the encoded data slice. Generation of the replicated data slice may include one or more of immediately retrieving the encoded data slice, retrieving the encoded data slice when a dispersed storage network (DSN) activity level compares favorably to an activity level threshold, rebuilding the encoded data slice (e.g., from related encoded data slices stored in other storage units), and forming the replicated encoded data slice from the encoded data slice such that the replicated encoded data slice is substantially the same as the encoded data slice.

The method continues at step 106 where the processing module sends the replicated encoded data slice to the identified at least one secondary storage unit for storage therein. Alternatively, or in addition to, the processing module determines whether the replicated encoded data slice is already stored in the at least one secondary storage unit, and sends the replicated encoded data slice to the at least one secondary storage unit when the replicated encoded data slice is not already stored therein. The method continues at step 108 where the processing module updates a slice storage location table (e.g., a table maintained by a higher-level controller and/or one or more storage units) to include an identifier associated with the at least one secondary storage unit. Updating the slice storage location table may include affiliating a slice name associated with the encoded data slice with the identifier associated with the at least one secondary storage unit.

The method continues at step 110 where the processing module determines whether the frequency of slice access of the encoded data slice compares favorably to a second slice access threshold. For example, the processing module determines that the frequency of slice access compares unfavorably to the second slice access threshold when the frequency of slice access is greater than the second slice access threshold. The method loops at step 110 when the processing module determines that the frequency of slice access compares unfavorably to the second slice access threshold. The method continues to step 112 when the processing module determines that the frequency of slice access compares favorably to the second slice access threshold.

At step 112, the processing module updates the slice storage location table to exclude at least one of the at least one secondary storage units. Updates to the slice storage table may include disassociating the slice name associated with the encoded data slice with an identifier associated with at least one of the at least one secondary storage unit. The at least one secondary storage unit (either independently or at the direction of another device) may delete the replicated encoded data slice, for example, after a fixed amount of time or when a time period since a last replicated encoded data slice access is greater than a deletion time threshold. The method repeats back to step 100.

The methods described above in conjunction with the storage units can alternatively be performed by other modules (e.g., DS client modules 34) of a dispersed storage network or by other devices (e.g., managing unit 20). Any combination of a first module, a second module, a third module, a fourth module, etc. of the computing devices and the storage units may perform the method described above. In addition, at least one memory section (e.g., a first memory section, a second memory section, a third memory section, a fourth memory section, a fifth memory section, a sixth memory section, etc. of a non-transitory computer readable storage medium) that stores operational instructions can, when executed by one or more processing modules of one or more computing devices and/or by the storage units of the dispersed storage network (DSN), cause the one or more computing devices and/or the storage units to perform any or all of the method steps described above.

As may be used herein, the terms "substantially" and "approximately" provides an industry-accepted tolerance for its corresponding term and/or relativity between items. Such an industry-accepted tolerance ranges from less than one percent to fifty percent. Such relativity between items ranges from a difference of a few percent to magnitude differences. As may also be used herein, the term(s) "configured to", "operably coupled to", "coupled to", and/or "coupling"

includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from Figure to Figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information. A computer readable memory/storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by one or more processing modules of a dispersed storage network (DSN), the DSN including a plurality of storage units, the method comprises:
   determining that a frequency of slice access of an encoded data slice stored in a first storage unit of the DSN exceeds a first slice access threshold, wherein a data segment of a data object is dispersed storage error encoded to produce a set of encoded data slices that includes the encoded data slice, and wherein a decode threshold number of encoded data slices of the set of encoded data slices is required to recover the data segment; and
   in response to determining that the frequency of slice access of the encoded data slice exceeds the first slice access threshold:
      identifying at least one secondary storage unit;
      replicating the encoded data slice to generate a replicated encoded data slice;
      sending the replicated encoded data slice to the at least one secondary storage unit for storage therein; and
      updating a slice storage location table to associate the at least one secondary storage unit and the replicated encoded data slice.

2. The method of claim 1 further comprises:
   determining that a frequency of slice access of the replicated encoded data slice is less than a second slice access threshold; and
   updating the slice storage location table to disassociate the at least one secondary storage unit and the replicated encoded data slice.

3. The method of claim 1, wherein determining at least one secondary storage unit is based on at least one of:
   a current access performance level;
   a performance requirement;
   an estimated access performance level;
   a request pattern;
   a candidate secondary storage unit list;
   a storage unit location;
   a storage unit performance level; or
   a storage unit Internet protocol (IP) address.

4. The method of claim 1, wherein updating the slice storage location table to associate the at least one secondary storage unit and the replicated encoded data slice includes at least one of:
   updating a slice storage location table maintained by the first storage unit;
   updating a slice storage location table maintained by the at least one secondary storage unit; or
   updating a slice storage location table maintained by a higher-level controller of the first storage unit.

5. The method of claim 1 further comprises:
   prior to sending the replicated encoded data slice to the at least one secondary storage unit for storage therein, determining that the replicated encoded data slice is not stored in the at least one secondary storage unit.

6. The method of claim 1 further comprises:
   obtaining the frequency of slice access of the encoded data slice based on at least one of:
      a frequency of slice access query;
      a lookup;
      a list;
      an error message;
      a request; or
      a command.

7. The method of claim 1, wherein replicating the encoded data slice to generate a replicated encoded data slice includes rebuilding the encoded data slice utilizing at least the decode threshold number of other encoded data slices of the set of encoded data slices.

8. The method of claim 1 further comprises:
   determining that an elapsed period of time since a last slice access of the replicated encoded data slice is less than a deletion time threshold;
   in response to determining that the elapsed period of time since a last access of the replicated encoded data slice is less than the deletion time threshold, deleting the replicated encoded data slice from the at least one secondary storage unit; and
   updating the slice storage location table to disassociate the at least one secondary storage unit and the replicated encoded data slice.

9. A computer readable storage medium comprises:
   at least one memory section that stores operational instructions that, when executed by one or more processing modules of a dispersed storage network (DSN) that include a processor and a memory, causes the one or more processing modules to:
      determine that a frequency of slice access of an encoded data slice stored in a first storage unit of the DSN exceeds a first slice access threshold, wherein a data segment of a data object is dispersed storage error encoded to produce a set of encoded data slices that includes the encoded data slice, and wherein a decode threshold number of encoded data slices of the set of encoded data slices is required to recover the data segment; and in response to determining that the frequency of slice access of the encoded data slice exceeds the first slice access threshold:
identify at least one secondary storage unit;
replicate the encoded data slice to generate a replicated encoded data slice;
send the replicated encoded data slice to the at least one secondary storage unit for storage therein; and
update a slice storage location table to associate the at least one secondary storage unit and the replicated encoded data slice.

10. The computer readable storage medium of claim 9 further comprises:
the at least one memory section stores further operational instructions that, when executed by the one or more processing modules, causes the one or more processing modules to:
determine that a frequency of slice access of the replicated encoded data slice is less than a second slice access threshold; and
in response to determining that the frequency of slice access of the replicated encoded data slice is less than the second slice access threshold, update the slice storage location table to disassociate the at least one secondary storage unit and the replicated encoded data slice.

11. The computer readable storage medium of claim 9 further comprises:
the at least one memory section stores further operational instructions that, when executed by the one or more processing modules, causes the one or more processing modules to:
prior to sending the replicated encoded data slice to the at least one secondary storage unit for storage therein, determine that the replicated encoded data slice is not stored in the at least one secondary storage unit.

12. The computer readable storage medium of claim 9, wherein identifying at least one secondary storage unit is based on at least one of:
a current access performance level;
a performance requirement;
an estimated access performance level;
a request pattern;
a candidate secondary storage unit list;
a storage unit location;
a storage unit performance level; or
a storage unit Internet protocol (IP) address.

13. The computer readable storage medium of claim 9, wherein updating the slice storage location table to associate the at least one secondary storage unit and the replicated encoded data slice includes at least one of:
updating a slice storage location table maintained by the first storage unit;
updating a slice storage location table maintained by the at least one secondary storage unit; or
updating a slice storage location table maintained by a higher-level controller of the first storage unit.

14. The computer readable storage medium of claim 9 further comprises:
the at least one memory section stores further operational instructions that, when executed by the one or more processing modules, causes the one or more processing modules to:

obtain the frequency of slice access of the encoded data slice based on at least one of:
a frequency of slice access query;
a lookup;
a list;
an error message;
a request; or
a command.

15. A storage unit for use in a dispersed storage network (DSN) having a plurality of storage units, the storage unit comprises:
a network interface;
a memory; and
a processing module operably coupled to the network interface and the memory, wherein the processing module is configured to:
determine that a frequency of slice access of an encoded data slice stored in the memory exceeds a first slice access threshold, wherein a data segment of a data object is dispersed storage error encoded to produce a set of encoded data slices that includes the encoded data slice, and wherein a decode threshold number of encoded data slices of the set of encoded data slices is required to recover the data segment; and
in response to determining that the frequency of slice access of the encoded data slice exceeds the first slice access threshold:
identify at least one secondary storage unit;
replicate the encoded data slice to generate a replicated encoded data slice;
send, via the network interface, the replicated encoded data slice to the at least one secondary storage unit for storage therein; and
update a slice storage location table to associate the at least one secondary storage unit and the replicated encoded data slice.

16. The storage unit of claim 15, wherein the processing module is further configured to:
determine that a frequency of slice access of the replicated encoded data slice is less than a second slice access threshold; and
in response to determining that the frequency of slice access of the replicated encoded data slice is less than the second slice access threshold, update the slice storage location table to disassociate the at least one secondary storage unit and the replicated encoded data slice.

17. The storage unit of claim 15, wherein identifying at least one secondary storage unit is based on at least one of:
a current access performance level;
a performance requirement;
an estimated access performance level;
a request pattern;
a candidate secondary storage unit list;
a storage unit location;
a storage unit performance level; or
a storage unit Internet protocol (IP) address.

18. The storage unit of claim 15, wherein updating the slice storage location table to associate the at least one secondary storage unit and the replicated encoded data slice includes at least one of:
updating a slice storage location table maintained in the memory of the storage unit;
updating a slice storage location table maintained by the at least one secondary storage unit; or updating a slice storage location table maintained by a higher-level controller of the storage unit.

19. The storage unit of claim 15, wherein the processing module is further configured to:
obtain the frequency of slice access of the encoded data slice based on at least one of:
a frequency of slice access query;
a lookup;
a list;
an error message;
a request; or
a command.

20. The storage unit of claim 15, wherein replicating the encoded data slice to generate a replicated encoded data slice includes rebuilding the encoded data slice utilizing at least the decode threshold number of other encoded data slices of the set of encoded data slices.

* * * * *